Patented Jan. 7, 1947

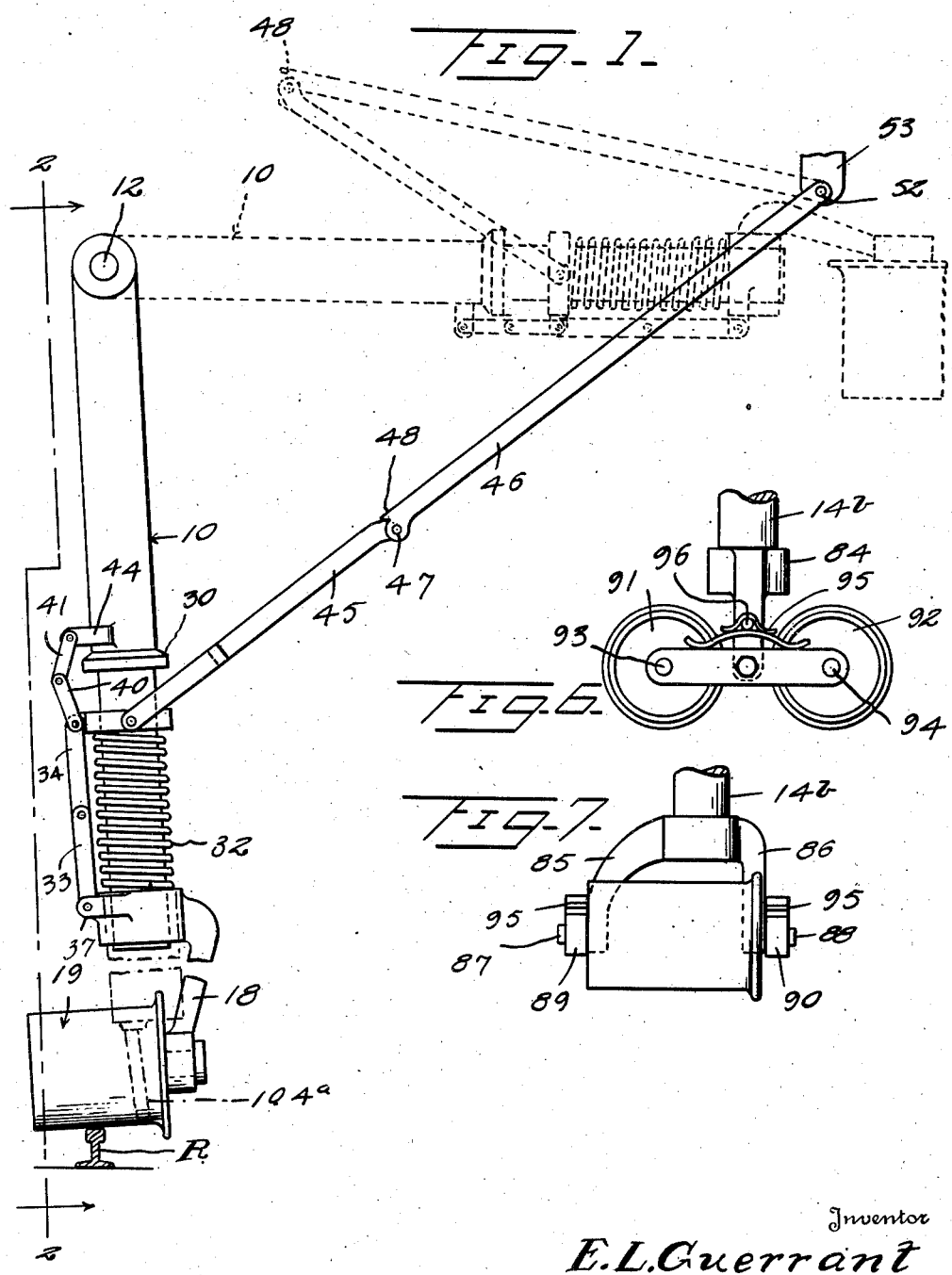

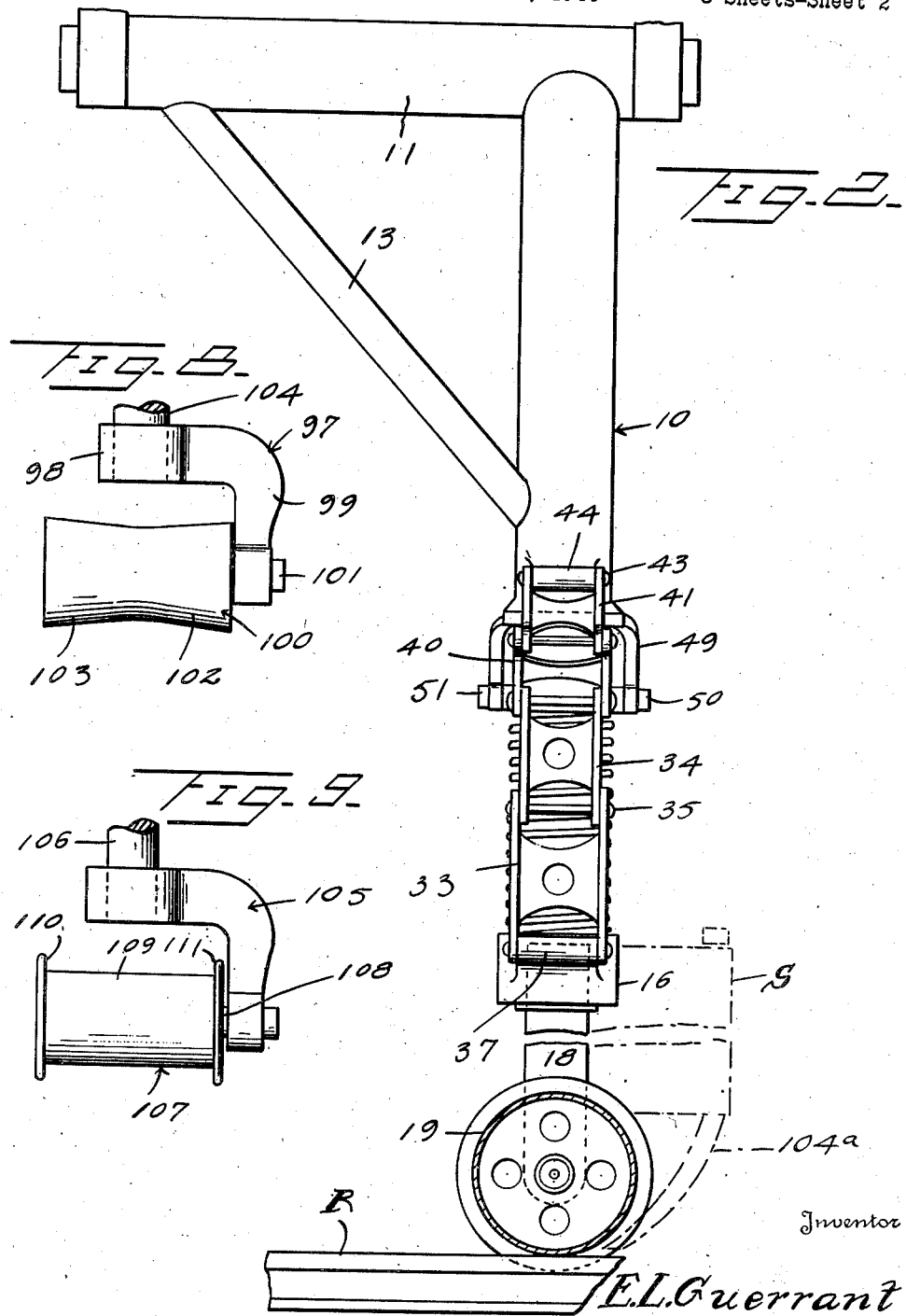

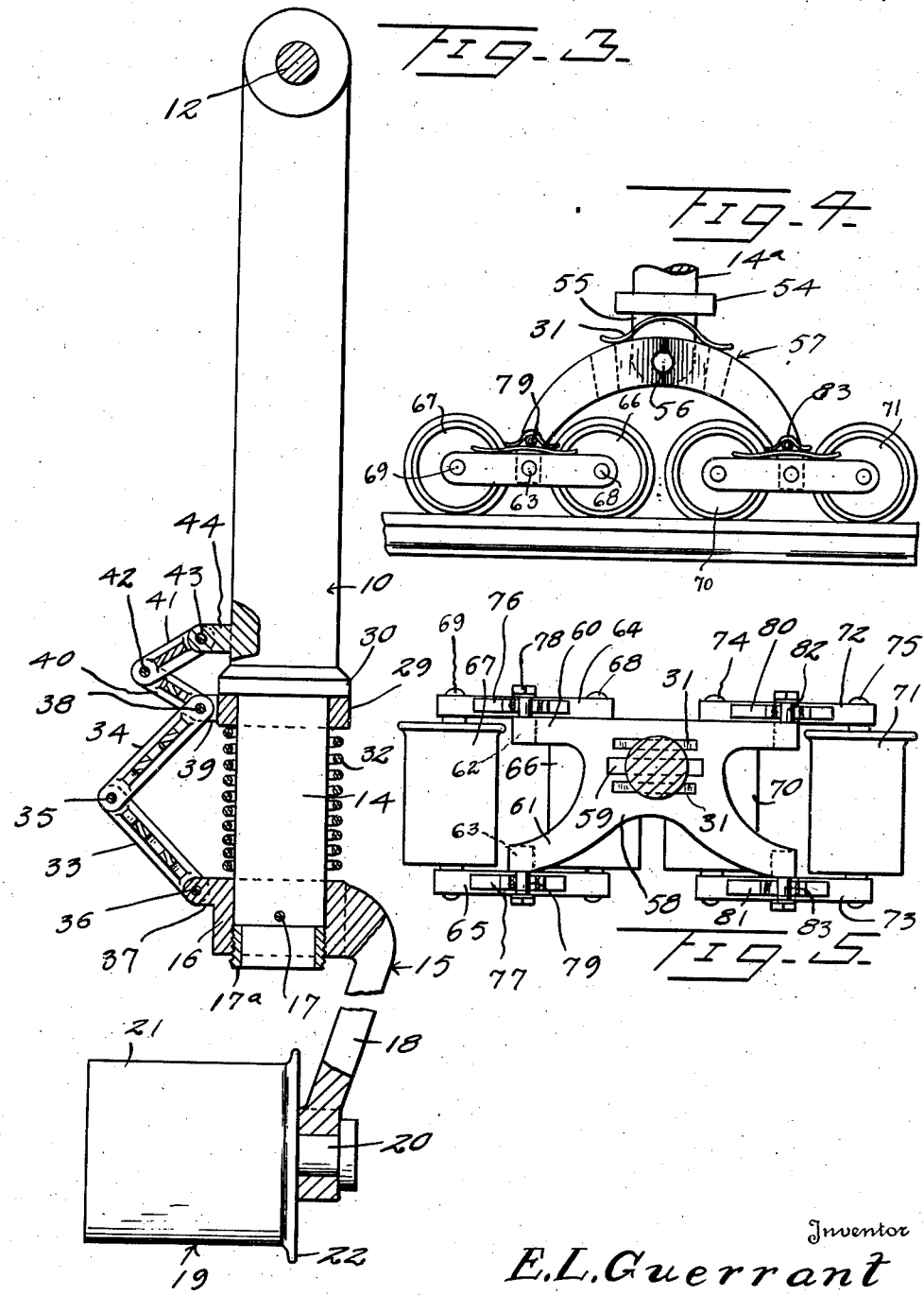

2,414,039

UNITED STATES PATENT OFFICE 2,414,039

AIRCRAFT LANDING GEAR FOR LANDING ON RAILS

Edmonds L. Guerrant, Fort Worth, Tex.

Application December 18, 1944, Serial No. 568,714

7 Claims. (Cl. 244—102)

This invention relates to retractable landing gear for landing airplanes on rails.

An object of this invention is to provide landing gears in combination with shock absorbing struts for an airplane which will permit landing on rails, or the like.

Another object of this invention is to provide landing gear which is designed particularly for large airplanes and will eliminate the use of rubber tires for use on airplanes too heavy for pneumatic tires and concrete runways.

A further object of this invention is to provide landing gear of this type which will automatically center the plane with respect to the landing rails, the gear embodying relatively wide flanged wheels which are adapted to move away from each other as the weight of the plane is borne by the wheels.

A further object of this invention is to provide landing gear which can be readily adapted for planes of varying weights, and which will remove the hazard of pneumatic tires while at the same time providing the necessary shock absorbing factors.

A further object of this invention is to provide landing gear which will reduce the weight of similar structure using pneumatic tires, the gear contemplated in this invention eliminating the weight of the pneumatic tires which, in large planes, are of considerable weight.

A further object of this invention is to provide landing gear of this type which will permit the use of brakes and traction increasing means so that the landed plane can be stopped within normal distances.

With the foregoing objects in view, and others which may hereinafter more fully appear, the invention consists of the novel construction, combination and arrangement of parts as will be more specifically referred to and illustrated in the accompanying drawings, wherein are shown embodiments of the invention, but it is to be understood that changes, modifications, and variations may be resorted to which fall within the scope of the invention, as claimed.

In the drawings:

Figure 1 is a detail front elevation of a landing gear constructed according to an embodiment of this invention.

Figure 2 is a sectional view taken on the line 2—2 of Figure 1.

Figure 3 is a detail front elevation, partly broken away and in section, of the gearing.

Figure 4 is a fragmentary side elevation of a modified form of wheel structure.

Figure 5 is a plan view, partly in section, of the wheel structure shown in Figure 4.

Figure 6 is a fragmentary side elevation of another form of wheel structure.

Figure 7 is a detail front elevation of the wheel structure shown in Figure 6.

Figure 8 is a front elevation of another form of wheel structure.

Figure 9 is a front elevation of a further form of wheel structure.

Referring to the drawings, the numeral 10 designates a combined strut and shock absorber, hereinafter referred to as a strut, and which has secured to the upper end thereof a tubular member 11, and a bracing member 13 extends between the vertical tubular strut member 10, and the tubular member 11. The tubular member 11 is adapted to be mounted on a shaft 12 which is carried by the airplane structure, and the strut 10 is adapted to rock on the shaft 12 from a retracted position within the airplane, to an extended depending and landing position.

The strut member 10 constitutes a cylinder within which a piston 14 is slidably mounted. The retraction of piston 14 is resisted by conventional hydraulic, or like means within the cylinder. The piston 14 extends below the lower end of the cylindrical strut member 10, and a wheel supporting bracket, generally designated as 15, is secured to the extended end of piston 14. The bracket 15 comprises an annulus 16 which may be secured by fastening means 17 to the extended or lower end of piston 14, and a downwardly extending arm 18 extends from the annulus 16. An annular nut 17a is threaded into the lower end of annulus 16, engaging about the reduced end 17b of piston 14. Nut 17a is adapted to bear the force exerted on piston 14 by weight of the airplane. A wheel 19 is rotatably carried by the lower end of the arm 18 being rotatable on a shaft 20 extending through arm 18.

Wheel 19 comprises a cylindrical body 21 of suitable length which has formed on the outer edge thereof an annular flange 22 adapted to engage the head of a rail when the landing gear is in its extended position and is supporting the weight of the airplane.

A collar or annulus 29 is slidably mounted on piston 14, and in its uppermost position is adapted to bear against an annular flange fixed to the lower end of cylindrical strut member 10. A cushioning spring 32 is interposed between annulus 29 and annulus 16, causing annulus 29 to move upwardly as piston 14 moves upwardly, and also provides an auxiliary shock absorbing means.

In order to provide a means whereby piston 14 will be limited in its downward movement, I have provided a pair of links 33 and 34 which are pivotally connected together as at 35. The lower end of link 33 is pivotally mounted, as at 36, to an ear 37 carried by annulus 16. The upper or opposite end of link 34 is pivotally mounted on a pivot member 38, carried by an ear or lug 39 extending from annulus 29. The downward movement of annulus 29 is also limited by means of a pair of links 40 and 41. The two links 40 and 41 are pivotally connected together as at 42, and link 40 is also pivotally mounted on pivot member 38. Link 41 is pivotally mounted on a pivot 43 carried by an ear or lug 44 fixed to and extending from the lower portion of strut member 10. Links 34, 35, 40 and 41 also provide a means to hold piston 14 against rotation and maintain wheel 19 in proper alignment.

Strut member 10 is limited in its rocking movement to an extended or landing position by means of a pair of pivotally connected link members 45 and 46. The link members 45 and 46 are pivotally connected together as at 47, and a stop lug 48 is carried by link member 46 and engages the adjacent end of link member 45 so that the two links 45 and 46 cannot swing downwardly beyond an aligning position.

Link 45, at its lower end, is formed with a fork 49 which is pivotally mounted on outstanding pins 50 and 51 engaging annulus 29. Link member 46 is pivotally mounted on an upper pivot 52 which is carried by a stationary part 53 forming a part of the airplane structure. When the landing gear is in retracted position it will be in the position shown in dotted lines in Figure 1.

Referring now to Figure 4 there is disclosed a modified form of wheel structure there being four wheels rotatably carried by lower end of each strut. In this form there is disclosed a piston 14ª similar to piston 14 which is formed with a fixed flange or collar 54 against which the lower end of spring 32 is adapted to engage. A downwardly extending ear 55 extends from the lower end of the piston 14ª and is rockably mounted on a pivot member 56 extending through a wheel supporting member 57. The wheel supporting member 57 is formed with a body 58, which is upwardly arched, and is provided with a slot 59 within which ear 55 rockably engages. The supporting member 57 is normally maintained horizontal by means of a pair of springs 31.

Body 58 is formed with two pairs of downwardly extending arms 60 and 61, and arms 60 and 61 are pivotally mounted on pivot members 62 and 63 engaging through connecting links 64 and 65. Connecting link 64 is disposed between a pair of flanged wheels 66 and 67 and wheels 66 and 67 are rotatably mounted on axles or shafts 68 and 69. Axles or shafts 68 and 69 are extended through wheels 66 and 67 respectively and also extended through link 65. There is a second or rear pair of wheels 70 and 71 rotatably carried by a rear pair of links 72 and 73. Wheel 70 is rotatably mounted on an axle or shaft 74 which engages through links 72 and 73. Wheel 71 is rotatably mounted on an axle or shaft 75 engaging through links 72 and 73. In order to provide for maintaining the pairs of wheels in a substantially horizontal position when the landing gear is extended, I have provided springs 76 and 77 engaging the upper sides of links 64 and 65.

The springs 76 and 77 are upwardly bowed and bear against outstanding pins 78 and 79 respectively, which extend from the outer sides of arms 60 and 61. Wheels 70 and 71 are also maintained in a normal horizontal position by upwardly bowed springs 80 and 81 which engage pins 82 and 83 respectively carried by the rearmost pair of arms 60 and 61.

Referring now to Figures 6 and 7, there is disclosed a wheel structure embodying a pair of wheels. In this form of the invention the piston 14ᵇ has secured to the lower end thereof an annulus 84 which has extending downwardly therefrom a pair of arms 85 and 86. The lower ends of arms 85 and 86 are rockably mounted on pivot members 87 and 88 respectively which are carried by a pair of connecting links 89 and 90. The links 89 and 90 have rotatably disposed therebetween a pair of flanged wheels 91 and 92 which are mounted on shafts 93 and 94 respectively. An upwardly bowed spring 95 engages at its free ends against the upper side of links 89 and 90, there being one spring for each link, and the upwardly bowed portion of spring 95 bears against outstanding pin 96 which extends from the arms 85 and 86.

Referring now to Figure 8, there is disclosed a form of wheel structure designed for use on either a rear or front strut between the pair of wheels, including a bracket, generally designated as 97. The bracket 97 includes an annulus 98 adapted to be mounted on the lower end of strut 104 of the conventional fixed or hydraulic and shock absorber type, and a downwardly extending arm 99 is formed integral with annulus 98. A wheel 100 is rotatably mounted on a shaft 101 carried by arm 99 and in the present form wheel 100 is in the form of a pair of opposed conical members 102 and 103, having their smaller ends innermost so as to provide a self-centering means whereby, when the wheel is engaged with a rail the wheel will automatically center itself on the head of the rail. Wheel 100 may be used for either the tail or nose portion of the airplane, or both, and may be used on all struts if desired, if all struts are of conventional type.

Referring now to Figure 9, there is disclosed another form of flanged wheel which may be used on either the front or rear struts. A bracket 105 is secured to the lower end of the strut 106, which may be either of the fixed or hydraulic shock absorber type. A wheel 107 is rotatably carried by a shaft 108 mounted in the bracket 105. The wheel 107 is formed with an elongated cylindrical body 109, having opposite end flanges 110 and 111.

It will be understood that the wheels disclosed in Figures 8 and 9 may be optionally used on the front strut of a tricycle landing gear, or may be used on the rear strut of a conventional landing gear. It will also be understood that the wheels disclosed in Figures 8 and 9 may also be used on the main landing gear, that is the pair of struts which comprise the main landing gear.

It will be understood that suitable braking means may be associated with any one or more of the wheels disclosed in the drawings, and in order to provide a means whereby additional traction may be formed between the wheels and the rail R, I have provided a sand box S which is adapted to be secured to the bracket 15. The sand box S has a discharge pipe 104ª extending downwardly therefrom for discharging the sand in front of the wheel 19. The discharge of sand from the sand box S may be regulated by any suitable means extending upwardly of the landing gear, and terminating within the cabin or fuselage of the airplane.

In the use and operation of this landing gear, when the gear is initially extended to the full line position shown in Figure 1, the opposed wheels carried by opposed struts will be disposed at an inclination to the vertical so that the rail R will initially contact the wheel 19 at substantially the lengthwise center thereof, as shown in Figure 1. In this position there will be a considerable portion of the wheel 19 extending from opposite sides of the rail R, and when the weight of the plane rests on the landing gear the strut 10 will be in a substantially vertical position which is the position indicated in Figure 3. It will be understood that there will be three landing rails, the outer rails for the main pair of wheels, and the center rail for the nose or tail wheel.

At the time the landing gear is in its initial inclined position, collar 29 will be disposed downwardly from fixed collar or flange 30 of cylinder strut 10. As the two links 45 and 46 are in rigid aligned position, when the weight of the plane forces compression of spring 32 and upward movement of piston 14 in cylinder 10, collar 29 will slide upwardly until it bears against fixed collar 30. In this upward movement of collar 29 strut 10 will swing toward the vertical until it assumes a substantially vertical position.

With the weight of the plane resting on the landing gear the links 33 and 34 and the links 40 and 41 will be in their collapsed position, as shown in Figure 3.

With a landing gear as hereinbefore described, the wheels may be made of any desired size and of material having sufficient strength to withstand the strain to which the wheels may be subjected. In addition to eliminating the weight of the pneumatic tire, the possibility of collapsing of the tire during the landing is also eliminated so that a landing gear as hereinbefore described has a greater safety factor for landing purposes than pneumatic tires. The wheels may be of sufficient length so that the pilot in landing will have enough leeway to land the plane on the rails.

It is, of course, well known that experienced pilots are able to land planes quite accurately and with rails for a landing strip the conditions of the landing will be identical irrespective of weather conditions. The cost of maintaining the landing rails is also considerably less than the maintenance cost and construction cost of concrete or other hard surface landing strips. In addition, the replacement cost of pneumatic tires is eliminated and the maintenance cost of wheels of this type is practically negligible.

What I claim is:

1. In an extensible and collapsible airplane strut formed of upper and lower members movable relative to each other, a collar slidably mounted on said lower member, a wheel supporting bracket carried by the lower end of said strut, a wheel carried by said bracket, a collapsible brace pivotally secured at one end to said collar, and pivotally secured at the opposite end to a stationary part of the airplane structure and adapted to initially hold the extended strut in a position inclined to the vertical, a collapsible linkage between said collar and said upper member, a second collapsible linkage between said collar and said lower member and a spring about said lower member bearing at its lower end against said bracket and at its upper end against said collar, said spring providing a yieldable means for holding said strut substantially vertical when said wheel is supporting the weight of the airplane.

2. In a structure as set forth in claim 1, wherein said wheel is formed with a flange at one end thereof.

3. Landing gear for airplanes comprising an extendible strut formed of upper and lower members, said lower member constituting a piston, a right angular bearing carried by the upper end of said upper member, means supporting a wheel below said lower member, a spring about said lower member, a collar slidable on said lower member and bearing against the upper end of said spring, a pair of pivotally connected links connected between said supporting means and said collar, a collapsible brace pivotally connected at one end to said collar and at the other end pivotally connected to the airplane, and a pair of pivotally connected links connected to said collar and the lower end of said upper member, said first and second pairs of links limiting the extension of said lower member from said upper member, said brace initially holding said strut at an inclination to the vertical, upward movement of said piston effecting collapse of said links, and upward movement of said collar effecting swinging of said strut to a vertical position.

4. Landing gear as set forth in claim 3, including a flanged wheel rotatably carried by said wheel supporting means.

5. Landing gear as set forth in claim 3, including two pairs of flanged wheels rotatably carried by said wheel supporting means.

6. Landing gear as set forth in claim 3, including a pair of flanged wheels rotatably carried by said wheel supporting means.

7. In an extensible and collapsible airplane strut formed of upper and lower members movable relative to each other, a collar slidably mounted on said lower member, a wheel supporting bracket carried by the lower end of said strut, a wheel carried by said bracket, a collapsible brace pivotally secured at one end to said collar and pivotally secured at the opposite end to a stationary part of the airplane structure and adapted to initially hold the extended strut in a position inclined to the vertical, a collapsible linkage pivotally connected at one end to said upper member and pivotally connected at the opposite end to said collar, and a spring about said lower member bearing at its lower end against said bracket and at its upper end against said collar, said spring providing a yieldable means for holding said strut substantially vertical when said wheel is supporting the weight of the airplane.

EDMONDS L. GUERRANT.